(12) United States Patent
Inaba

(10) Patent No.: US 6,257,483 B1
(45) Date of Patent: Jul. 10, 2001

(54) NICKEL-BASED BRAZING MATERIAL, METHOD OF BRAZING WITH THE BRAZING MATERIAL, PROCESS FOR PRODUCING EGR COOLER WITH THE BRAZING MATERIAL, AND EGR COOLER

(75) Inventor: Junpei Inaba, Kanagawa (JP)

(73) Assignees: Calsonic Corporation, Tokyo; Tokyo Radiator Mfg. Co., Ltd., Kanagawa, both of (JP)

( * ) Notice: Subject to any disclaimer, the term of this patent is extended or adjusted under 35 U.S.C. 154(b) by 0 days.

(21) Appl. No.: 09/168,904

(22) Filed: Oct. 9, 1998

(30) Foreign Application Priority Data

Oct. 9, 1997 (JP) ........................................ 9-291761
Oct. 6, 1998 (JP) ...................................... 10-283878

(51) Int. Cl.[7] ............................. B23K 1/19; B23K 31/00; C22C 1/04
(52) U.S. Cl. ............................... 228/262.42; 228/248.1; 228/248.5; 228/183; 75/255
(58) Field of Search ......................... 428/679, 685; 75/255; 228/262.42, 248.1, 248.5, 183

(56) References Cited

U.S. PATENT DOCUMENTS

| 3,953,285 | * | 4/1976 | Martini et al. . |
| 4,402,742 | * | 9/1983 | Pattanaik . |
| 4,712,603 | * | 12/1987 | Bose et al. . |
| 5,127,969 | * | 7/1992 | Sekhar . |
| 5,915,472 | * | 6/1999 | Takikawa et al. . |
| 6,062,304 | * | 5/2000 | Kremer et al. . |

FOREIGN PATENT DOCUMENTS

| 332 524 | * | 3/1989 | (EP) . |
| 225 1628 | * | 1/1992 | (GB) . |
| 61-140284 | | 8/1986 | (JP) ............................... F16L/13/08 |
| 01 053 796 | * | 8/1987 | (JP) . |
| 11 047 980 | * | 7/1997 | (JP) . |
| 11 237 192 | * | 8/1999 | (JP) . |
| 11 241 891 | * | 9/1999 | (JP) . |

OTHER PUBLICATIONS

"Improved of brazing layer for wide clearance joint, Joint characteristics by Ni brazing alloy (Report–3)", Hisamori et al., Mar. 4, 1990, pp. 172–173.

* cited by examiner

Primary Examiner—Deborah Jones
Assistant Examiner—Jason Savage
(74) Attorney, Agent, or Firm—Sughrue, Mion, Zinn, Macpeak & Seas, PLLC

(57) ABSTRACT

Disclosed is a nickel-based brazing material obtained by adding to powdery brazing nickel a powder of at least one metal selected from the group consisting of nickel, chromium, nickel-chromium alloys, and SUS (stainless steel) in an amount of from 2 to 10% by weight, excluding 10% by weight, based on the nickel-based brazing material, followed by mixing.

6 Claims, 4 Drawing Sheets

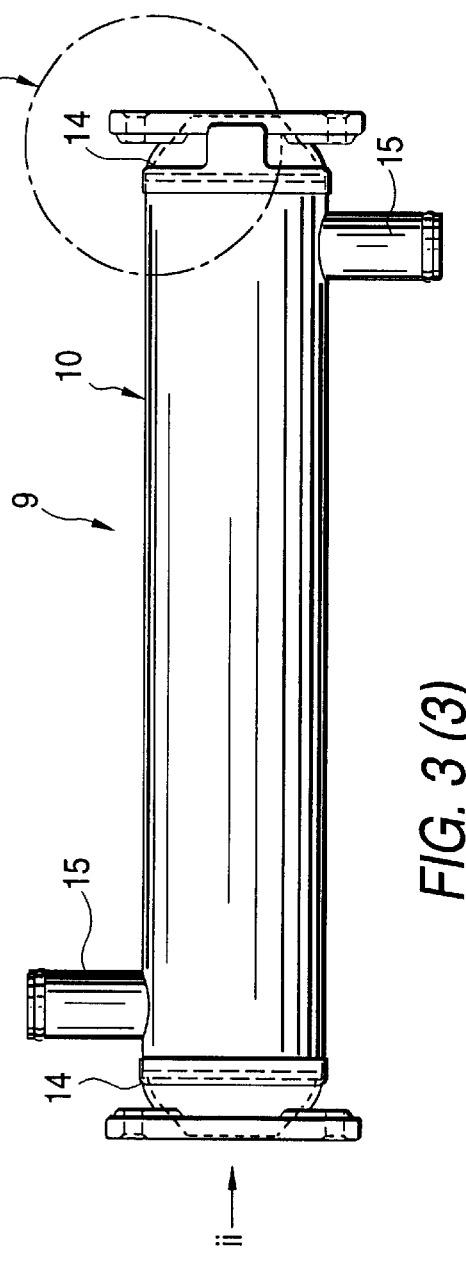
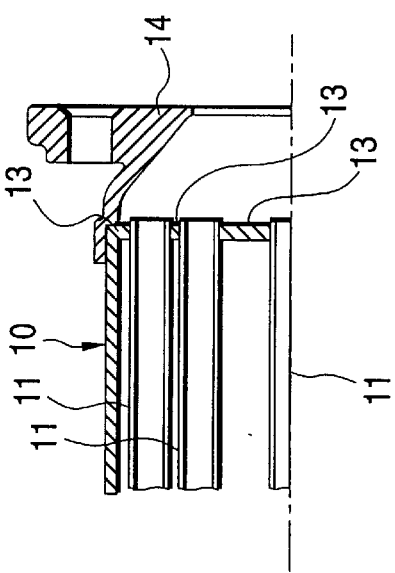
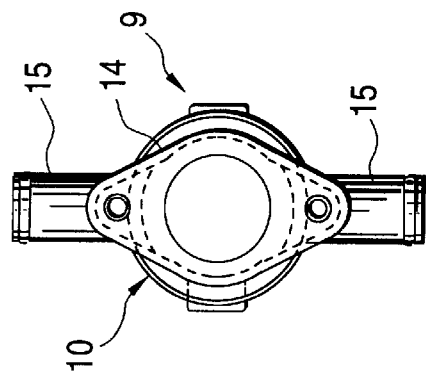
FIG. 3 (1)
FIG. 3 (3)
FIG. 3 (2)

NICKEL-BASED BRAZING MATERIAL, METHOD OF BRAZING WITH THE BRAZING MATERIAL, PROCESS FOR PRODUCING EGR COOLER WITH THE BRAZING MATERIAL, AND EGR COOLER

FIELD OF THE INVENTION

The present invention relates to a nickel-based brazing material and a method of brazing with the brazing material. More particularly, this invention relates to a nickel-based brazing material which has good flowability and gives highly tough brazed joints, and to a brazing method with this brazing material.

The present invention further relates to a nickel-based brazing material for use in EGR cooler fabrication, a process for producing an EGR cooler using the brazing material, and an EGR cooler. More particularly, this invention relates to a nickel-based brazing material for EGR cooler fabrication which can have an improved structure after brazing, a process for producing an EGR cooler using this brazing material, and an EGR cooler.

BACKGROUND OF THE INVENTION

In producing heat exchangers, e.g., radiators, there have been cases where a joint between two members comprising stainless steel is brazed with a brazing nickel.

As prescribed in JIS Z3265-1986, this brazing nickel is an alloy comprising nickel as the main component and additives such as boron, silicon, chromium, iron, and phosphorus.

These additives serve to regulate the melting point of the brazing material, to improve the flowability of the molten brazing material and the ability thereof to wet base materials, and to improve the toughness of the hardened brazing material.

When such a nickel-based brazing material solidifies, an α-phase of nickel crystallizes out as highly tough primary crystals and this crystallization begins at the interface with the base material. Hence, brittle phases comprising intermetallic compounds of other metals, e.g., silicon, boron, and phosphorus, are apt to crystallize out at the center of the bonding part and in inner parts and surfaces of the fillets.

If such brittle phases generate continuously in brazing parts, cracking is apt to occur in the brazing parts, in particular in the fillet parts (see FIG. 1). Since continuous brittle phases frequently concentrate in the finally solidified areas, cracks also concentrate therein. In particular, the finally solidified areas tend to develop long cracks extending to the surfaces of the fillets.

The brazing fillet parts which have developed long cracks extending to the fillet surfaces in products in which a liquid is in contact with the brazing fillet parts, e.g., in radiators, suffer penetration of the liquid into the long cracks extending to the fillet surfaces, resulting in crevice corrosion. It is hence desired to prevent the generation of such cracks extending to fillet surfaces.

A prior art technique which has been regarded as effective in eliminating brittle phases for coping with long cracks in brazing fillet parts is to reduce the fillet size and employ a higher brazing temperature and a longer brazing time.

However, it is difficult to prevent the crack generation with the above technique.

Furthermore, especially in the case of EGR coolers, there is a problem that since corrosive fluids such as high-temperature exhaust gas, cooling water, and exhaust gas condensate water come into contact with brazing fillet parts, these corrosive fluids penetrate into cracks in the brazing parts to cause crevice corrosion. In addition, the brittle phases themselves exposed on the fillet surfaces are susceptible to corrosion by corrosive fluids, and the corrosion of the brittle phases accelerates the crevice corrosion.

SUMMARY OF THE INVENTION

A first object of the present invention is to provide a nickel-based brazing material which does not generate continuous brittle phases, is hence prevented from developing cracks, and can give a highly tough bonding part structure, and to provide a method of brazing with this brazing material.

A second object of the present invention is to provide: a nickel-based brazing material for EGR cooler fabrication which attains an improved brazing part structure, has been regulated so as not to yield continuous brittle-phase crystals in fillet parts and as to yield many crystals of an α-phase of nickel in the fillet part surfaces, and is hence prevented from yielding brittle-phase crystals in the fillet surfaces, and which therefore can be prevented from undergoing cracking or crevice corrosion attributable to the partial corrosion of surface brittle phases, has satisfactory corrosion resistance, and is excellent in high-temperature oxidation resistance and resistance to repeated thermal stress; a process for producing an EGR cooler using the brazing material; and an EGR cooler.

In order to accomplish the first object, the inventor has found that fillet parts can be prevented from yielding continuous brittle phases and developing long cracks extending to the fillet surfaces by mixing powdery brazing nickel with a given amount of a powder of at least one specific metal.

In order to accomplish the second object, the inventor made various experiments and, as a result, has found that the formation of continuous crystals of brittle phases within fillet parts can be prevented and many crystals of an α-phase of nickel can be formed in the fillet surfaces while diminishing the crystallization of brittle phases in the fillet surfaces, by mixing powdery brazing nickel for EGR cooler fabrication with a given amount of a powder of at least one specific metal.

Thus, fillet parts can be prevented from developing cracks in the brittle phases present therein, and the brittle phases present in the fillet surfaces can be prevented from corroding to thereby effectively prevent the crevice corrosion caused by the penetration of a corrosive fluid. Furthermore, since densely dispersed crystals of an α-phase of nickel which is excellent in toughness and corrosion resistance are formed in the fillet parts at joints in an EGR cooler, the fillet parts can be improved in high-temperature oxidation resistance, resistance to repeated thermal stress, and the toughness of the joints.

Namely, the means for accomplishing the above objects are as follows.

(1) A nickel-based brazing material obtained by adding to powdery brazing nickel a powder of at least one metal selected from the group consisting of nickel, chromium, nickel-chromium alloys, and SUS (stainless steel) in an amount of from 2 to 10% by weight, excluding 10% by weight, based on the nickel-based brazing material, followed by mixing.

(2) The nickel-based brazing material as described in (1) above, wherein the content of the metal powder is from 4 to 7% by weight based on the nickel-based brazing material.

(3) The nickel-based brazing material as described in (1) above, wherein the metal powder has a particle diameter of 20 μm or smaller.

(4) A method of brazing which comprises bonding two base materials each made of a stainless steel with the nickel-based brazing material as described in (1) above.

(5) A method of brazing which comprises bringing two base materials each made of a stainless steel into contact with each other at the respective bonding areas and causing a melt of the nickel-based brazing material as described in (1) above to penetrate into the crevice between the contact surfaces of the base materials by the capillary phenomenon to bond the base materials.

(6) A nickel-based brazing material for use in bonding stainless-steel members for constituting an EGR cooler, said nickel-based brazing material being obtained by adding to powdery brazing nickel a powder of at least one metal selected from the group consisting of nickel, chromium, nickel-chromium alloys, and SUS (stainless steel) in an amount of from 2 to 22% by weight, followed by mixing.

(7) The nickel-based brazing material as described in (6) above, wherein the content of the metal powder is from 5 to 20% by weight based on the nickel-based brazing material.

(8) The nickel-based brazing material as described in (6) above, wherein the metal powder has a particle diameter of 20 µm or smaller.

(9) A process for producing an EGR cooler which comprises bonding stainless-steel members for the EGR cooler with the nickel-based brazing material as described in (6) above.

(10) An EGR cooler which comprises two or more stainless-steel members and the nickel-based brazing material as described in (6) above used in bonding the members to each other.

BRIEF DESCRIPTION OF THE DRAWINGS

FIG. 3 is views illustrating the shell of an EGR cooler to which the present invention is applied; (1) is a longitudinal sectional view of the shell, (2) is an end view from the direction ii, and (3) is an enlarged view of-the part iii shown in (1).

DETAILED DESCRIPTION OF THE INVENTION

According to the present invention, the first object can be accomplished by adding a powder of at least one metal selected from the group consisting of nickel, chromium, nickel-chromium alloys, and SUS (stainless steel) in an amount of from 2 to 10% by weight, excluding 10% by weight, and preferably from 4 to 7% by weight. If the metal powder is added in an amount smaller than 2% by weight, continuous brittle phases generate, resulting in cracking. If the metal powder is added in an amount not smaller than 10% by weight, many voids generate.

The metal powder to be used preferably has a particle diameter of 20 µm or smaller. The particle diameter of this metal powder influences the effects of the present invention. When the molten nickel-based brazing material penetrates into the crevice between the overlapping areas of plate materials by the capillary phenomenon, the added powder particles come into the crevice simultaneously with the penetration. Consequently, the particle diameter of the metal powder is preferably not larger than the crevice size.

In the present invention, use of the metal powder has an advantage that an α-phase of nickel is apt to generate in brazing with the nickel-based brazing material.

Figure 1:
FIG. 1 is a half-tone image illustrating a photomicrograph of a section of a brazing part obtained from a conventional nickel-based brazing material by a brazing method using the brazing material.
Figure 2:
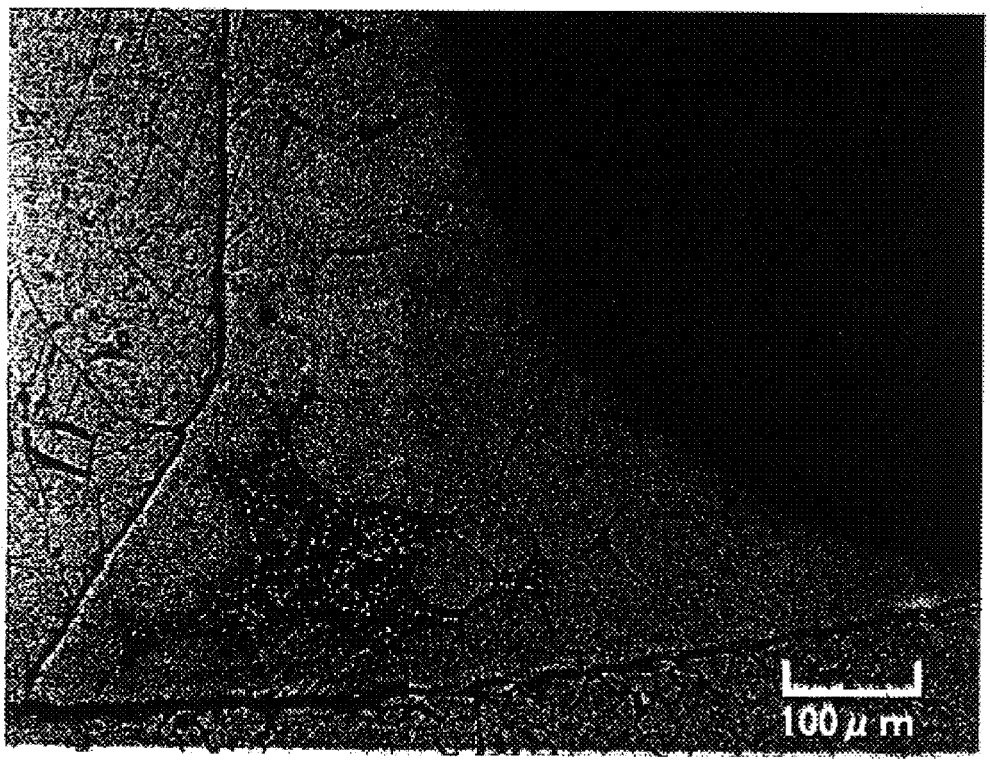
FIG. 2 is a half-tone image illustrating a photomicrograph of a section of a fillet part obtained from a nickel-based brazing material according to the present invention by a brazing method using the brazing material.
Figure 4:
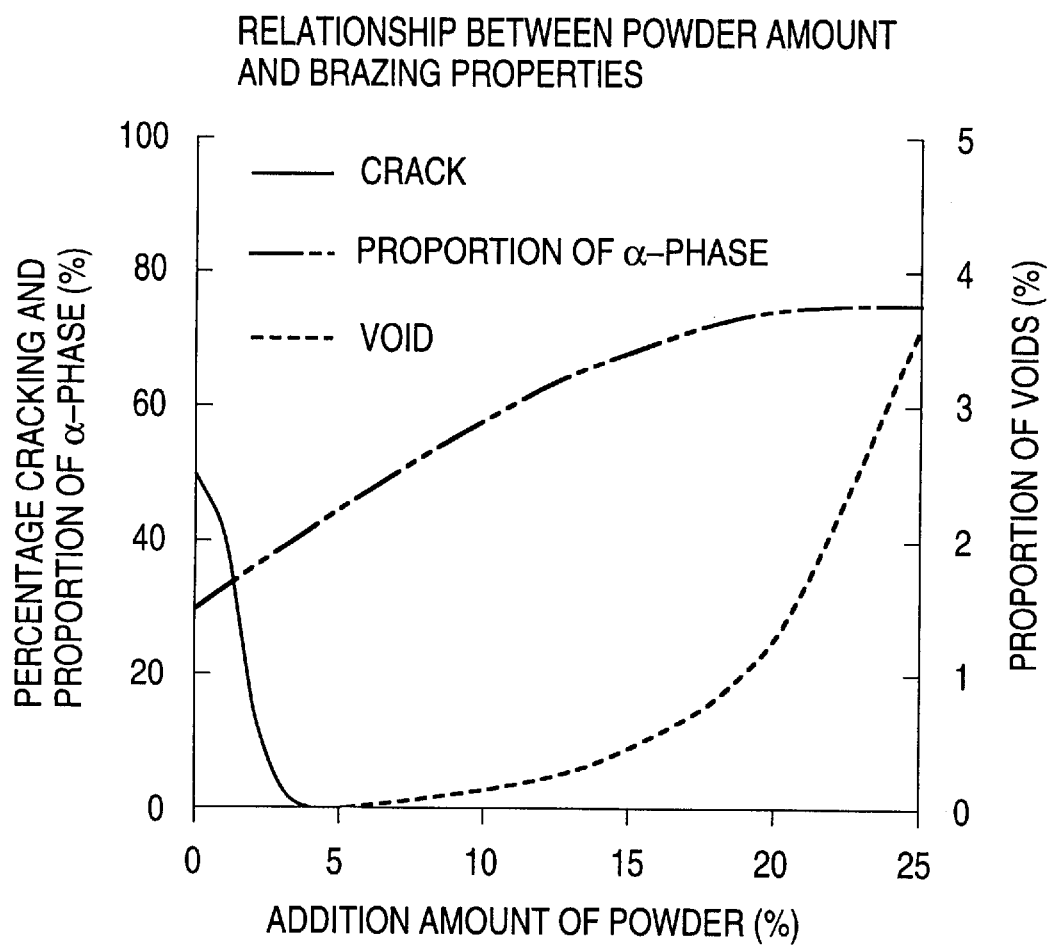
FIG. 4 is a graphic presentation showing the relationship between the addition amount of a powder and brazing properties in a nickel-based brazing material for EGR cooler fabrication according to the present invention.

According to the nickel-based brazing material of the present invention and the method of brazing with the brazing material, an α-phase of nickel crystallizes out as primary crystals not only on the base material surface but also dispersedly throughout the whole brazing material, as shown in FIG. 2, due to the addition of a specific amount of the specific metal powder described above. Consequently, brittle phases do not crystallize out continuously, i.e.. the brittle phases are separated by the α-phase of nickel and are thus dispersed in the brazing material. Even when this nickel-based brazing material is applied in an excess amount to parts to be brazed, the resultant large fillets do not develop cracks as shown in FIG. 2.

In general, when a molten nickel-based brazing material solidifies, the growth of an α-phase of nickel begins from the base material surface and brittle phases concentrate in the center and the surface of a fillet part, which solidify last. According to the nickel-based brazing material of the present invention, since an α-phase of nickel grows on the added particles of a metal, e.g., nickel, as nuclei, densely dispersed crystals of the α-phase of nickel are formed throughout-the whole brazing part. As a result, the formation of continuous crystals of brittle phases within the fillet part is prevented and many crystals of an α-phase of nickel can be formed also in the fillet surface to inhibit the crystallization of brittle phases in the fillet surface.

Because of the above, the nickel-based brazing material of the present invention is effective in preventing the fillet part from developing cracks and in preventing the brittle phases present on the fillet part surface from corroding, whereby crevice corrosion can be prevented.

Furthermore, since many crystals of an α-phase of nickel which has satisfactory corrosion resistance and toughness are formed in the bonding part, the bonding part is excellent in resistance to exhaust gas and cooling water, high-temperature oxidation resistance, and resistance to repeated thermal stress. Therefore, the nickel-based brazing material, when used in EGR cooler fabrication, can give an EGR cooler having enhanced durability.

According to the present invention, the second object described hereinabove can be accomplished by adding a powder of at least one metal selected from the group consisting of nickel, chromium, nickel-chromium alloys, and SUS (stainless steel) in an amount of from 2 to 22% by weight, preferably from 5 to 20% by weight, to a powdery brazing nickel for a nickel-based brazing material for use in bonding stainless-steel members for constituting an EGR cooler.

The larger the addition amount of the metal powder, the larger the proportion of an α-phase of nickel in fillet parts.

However, even though the addition amount thereof is increased beyond 22%, the proportion of an α-phase of nickel hardly increases any more. Experiments revealed that the addition of the metal powder in an amount of 5% by weight or larger results in a percentage cracking of 0.

On the other hand, it has been found that increasing the addition amount of the metal powder in a nickel-based brazing material enhances void generation. However, as shown in Table A below, it has been ascertained that the brazing part formed from the nickel-based brazing material for use in bonding stainless-steel members for constituting an EGR cooler has sufficient resistance to corrosion when its void content (areal proportion) is 2% or lower, i.e., when the addition amount of the metal powder is 22% or smaller.

TABLE A

Relationship between areal void proportion and crevice corrosion

| Areal void proportion (%) | Occurrence of crevice corrosion |
|---|---|
| 0.0 | not occurred |
| 0.15 | not occurred |
| 0.45 | not occurred |
| 1.3 | not occurred |
| 1.9 | not occurred |
| 2.3 | occurred |
| 2.6 | occurred |
| 3.6 | occurred |

The α-phase of nickel which has crystallized out in the brazing material structure is constituted of nickel, chromium, a slight amount of silicon, and a slight amount of iron which has dissolved out of the stainless-steel base material, and the nickel and the chromium serve to improve toughness and corrosion resistance. Consequently, by adding nickel, chromium, and alloys of these (Ni-Cr, SUS) as the metal powder, the crystallization of the α-phase of nickel can be controlled without impairing the toughness and corrosion resistance of the α-phase of nickel.

Stainless steel forms an exceedingly thin chromium oxide film (passive film) on its surface to thereby have improved corrosion resistance. The α-phase of nickel which has crystallized out in the fillet surface is thought to likewise form a chromium oxide film (passive film) to thereby have improved corrosion resistance. Consequently, a metal powder having a composition close to that of the α-phase of nickel is added so as not to impair the corrosion resistance and toughness of the α-phase of nickel, whereby the α-phase of nickel can be crystallized out satisfactorily.

In the nickel-based brazing material, the α-phase not only crystallizes out on the surface of the base material which is a stainless-steel part of an EGR cooler, but also dispersedly crystallizes out throughout the whole brazing material while utilizing the metal particles as nuclei. Consequently, brittle phases do not generate continuously within the fillet and, hence, the fillet part can be prevented from developing cracks.

Furthermore, since the nickel-based brazing material of the present invention for use in an EGR cooler gives a fillet part in which the fillet surface has many crystals of an α-phase of nickel and the crystallization of brittle phases in the fillet part surface has been diminished, crevice corrosion can be effectively prevented from occurring from the surface brittle phases. Moreover, since crystals of an α-phase of nickel which is excellent in toughness and corrosion resistance are densely dispersed in the fillet parts in joints of an EGR cooler, it is possible to effectively attain improvements in the high-temperature oxidation resistance and resistance to repeated thermal stress of the fillet parts, an improvement in the toughness of the joints, and prevention of the crevice corrosion caused by chlorine ions contained in cooling water or by exhaust condensate water. Therefore, an EGR cooler having excellent durability can be obtained.

The nickel-based brazing material for use in EGR cooler fabrication, the process for EGR cooler production using the same, and the EGR cooler all according to the present invention will be explained below by reference to an embodiment.

This embodiment shows an application of the present invention to the production of an EGR cooler made of stainless steel.

This embodiment, which is shown in FIG. 3, is an EGR cooler 9 for cooling the exhaust gas in an EGR system to be returned to an exhaust gas intake. As shown in FIG. 3, the nickel-based brazing material is used for attaching tubes 11 for passing a cooling medium (e.g., water) therethrough to an end plate 13 disposed in a shell 10 of the cooler 9. Besides being used in this bonding of the tubes 11 to the end plate 13, the nickel-based brazing material is used also for bonding the end plate 13 to the shell 10, bonding the shell 10 to header 14, and bonding the shell 10 to pipes 15.

In producing the EGR cooler 9, the brazing material is applied to the bonding part between a tube 11 and the end plate 13 and to other bonding parts, and the whole components are heated in a vacuum oven to cause the brazing material to penetrate into the crevice between the tube 11 and the end plate 13, etc.

This EGR cooler shown as an embodiment has improved high-temperature oxidation resistance because the nickel-based brazing material according to the present invention is used in parts to be in direct contact with an EGR gas, cooling water, etc., and because the bonding parts have many crystals of an α-phase of nickel which is highly corrosion-resistant.

This EGR cooler shown as an embodiment can also be made to resist repeated thermal stress because crystals of an α-phase of nickel which is highly tough are densely dispersed in the bonding parts formed from the nickel-based brazing material.

Furthermore, this EGR cooler shown as an embodiment can have high resistance to the crevice corrosion caused by cooling water containing chlorine ions and to the corrosion caused by exhaust gas condensate water which is highly corrosive, because the fillet parts at the joints are highly tough and are less apt to develop cracks, and because the fillet part surfaces have many crystals of an α-phase of nickel which is highly corrosion-resistant.

EXAMPLES

Using the brazing materials shown below, base materials were brazed. The brazed base materials were tested by examining sections thereof.

The brazing nickel used in the following tests was in a powder state as prescribed in JIS Z3265-1986. Powders of nickel, chromium, nickel-chromium, and stainless steel (SUS) each was added to the brazing nickel to prepare brazing materials.

These brazing materials each was prepared while varying the proportion of the metal powder as shown in Tables 1 to 4. Test pieces were prepared with these brazing materials, and a section of a bonding part of each test piece was microscopically examined for voids and cracks.

Example 1

A nickel-based brazing material was prepared by incorporating powdery nickel having an average particle diameter of 20 μm or smaller as a metal powder in an amount of 5% by weight into powdery brazing nickel B Ni-5 prescribed in JIS Z 3265-1986.

Figure 5:
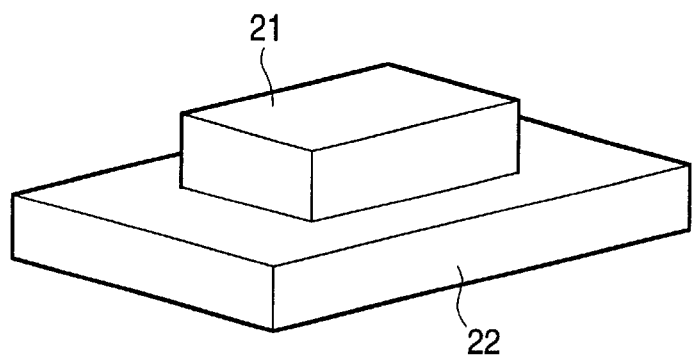
FIG. 5 is a slant view illustrating the bonded state of a test piece shown in an Example of the present invention.
Figure 6:
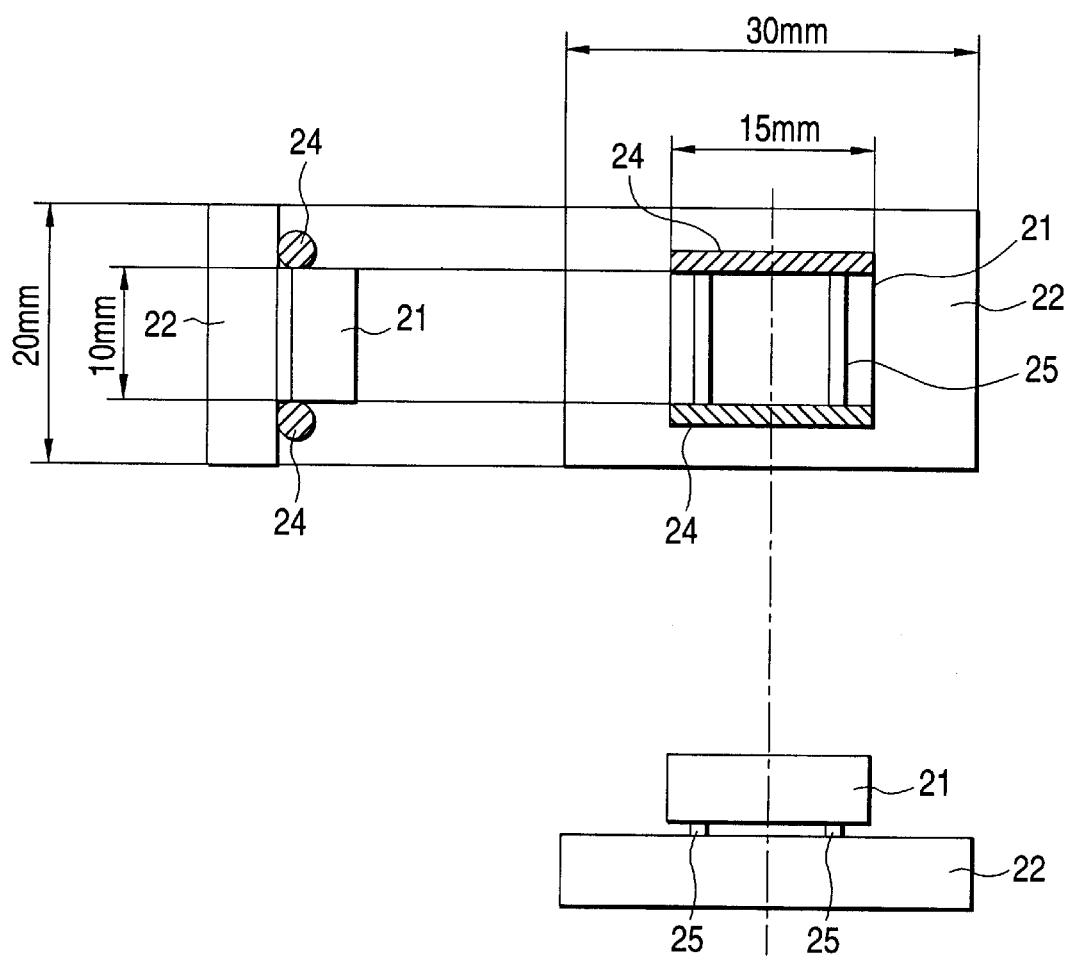
FIG. 6 is views from three directions showing how the test piece shown in the Example of the present invention was bonded.

As shown in FIGS. 5 and 6, a stainless-steel plate material 21 (10(W)×15(L)×5(T) mm) was superposed on a stainless-steel plate material 22 (20(W)×30(L)×5(T) mm) through 100-μm tungsten wires 25, and a composition obtained by kneading the nickel-based brazing material 24 together with 5 g of a synthetic resin binder was applied to the longer edges of the plate material 21. The superposed test pieces were heated in a vacuum oven.

The tungsten wires 25 were interposed between the test pieces so as to take account of the maximum error of surface finish in materials to be subjected to actual brazing.

The nickel-based brazing material 24 melted and penetrated into the crevice between the plate materials 21 and 22 by the capillary phenomenon to fill the crevice between the two plate materials.

The excess brazing material resulting from the filling of the crevice between the plate materials 21 and 22 formed fillet parts at corners of the plate materials.

The same experiment was conducted with respect to nickel-based brazing materials having various proportions (wt %) of the powdery nickel. The test pieces were cut, examined with a microscope for given properties, and evaluated for the properties. The results of these evaluations are shown in Table 1.

TABLE 1

| Proportion of powdery Ni (wt %) | Void | Crack |
| --- | --- | --- |
| 0 | ⊚ | X |
| 1 | ⊚ | Δ |
| 2 | ⊚ | ○ |
| 3 | ⊚ | ○ |
| 4 | ⊚ | ⊚ |
| 5 | ⊚ | ⊚ |
| 6 | ⊚ | ⊚ |
| 7 | ⊚ | ⊚ |
| 8 | ○ | ⊚ |
| 9 | ○ | ⊚ |
| 10 | ○ | ⊚ |
| 11 | Δ | ⊚ |
| 12 | Δ | ⊚ |
| 13 | Δ | ⊚ |
| 14 | Δ | ⊚ |
| 15 | Δ | ⊚ |

Criteria for Evaluation
⊚ satisfactory
○ slightly occurred, but satisfactory
Δ slightly unsatisfactory
X unsatisfactory The above results show that when the proportion of powdery nickel was 1% by weight or larger, the nickel particles served as nuclei to enable primary crystals of α-phase nickel to not only generate at the boundary facing the base material but also dispersedly generate throughout the whole brazing material. Due to this crystallization of α-phase nickel, brittle phases did not crystallize out continuously in the brazing material, and dispersed brittle-phase crystals separated by the α-phase nickel were formed in the fillets. As a result, neither the bonding part nor the fillet parts developed cracks.

Even large fillet parts which had resulted from excess brazing material application did not develop a long crack extending from an inner part of the fillet to the surface thereof, as shown in FIG. 2.

The results further showed that proportions of powdery nickel exceeding 10% resulted in increased amounts of voids. It was also found that addition amounts of powdery nickel not smaller than 7% resulted in considerable generation of minute voids, and that when the addition amount of powdery nickel was 4% or larger, even minute cracks did not generate.

It was hence found that powdery nickel was effective when it was added in an amount of from 2 to 10% by weight, excluding 10% by weight, and preferably from 4 to 7%.

Example 2

The same test as in Example 1 was conducted, except that chromium was used as a metal powder to be incorporated. The resultant test pieces were evaluated in the same manner. The results of these evaluations are shown in Table 2.

TABLE 2

| Proportion of powdery Cr (wt %) | Void | Crack |
| --- | --- | --- |
| 0 | ⊚ | X |
| 1 | ⊚ | Δ |
| 2 | ⊚ | ○ |
| 3 | ⊚ | ○ |
| 4 | ⊚ | ⊚ |
| 5 | ⊚ | ⊚ |
| 6 | ⊚ | ⊚ |
| 7 | ⊚ | ⊚ |
| 8 | ○ | ⊚ |
| 9 | ○ | ⊚ |
| 10 | ○ | ⊚ |
| 11 | Δ | ⊚ |
| 12 | Δ | ⊚ |
| 13 | Δ | ⊚ |
| 14 | Δ | ⊚ |
| 15 | Δ | ⊚ |

Example 3

The same test as in Example 1 was conducted, except that a nickel-chromium alloy was used as a metal powder to be incorporated. The resultant test pieces were evaluated in the same manner. The results of these evaluations are shown in Table 3.

TABLE 3

| Proportion of powdery Ni—Cr (wt %) | Void | Crack |
| --- | --- | --- |
| 0 | ⊚ | X |
| 1 | ⊚ | Δ |
| 2 | ⊚ | ○ |
| 3 | ⊚ | ○ |
| 4 | ⊚ | ⊚ |
| 5 | ⊚ | ⊚ |
| 6 | ⊚ | ⊚ |
| 7 | ⊚ | ⊚ |
| 8 | ○ | ⊚ |
| 9 | ○ | ⊚ |
| 10 | ○ | ⊚ |
| 11 | Δ | ⊚ |
| 12 | Δ | ⊚ |
| 13 | Δ | ⊚ |
| 14 | Δ | ⊚ |
| 15 | Δ | ⊚ |

Example 4

The same test as in Example 1 was conducted, except that SUS (stainless steel) was used as a metal powder to be incorporated. The resultant test pieces were evaluated in the same manner. The results of these evaluations are shown in Table 4.

TABLE 4

| Proportion of powdery SUS (wt %) | Void | Crack |
|---|---|---|
| 0 | ◎ | X |
| 1 | ◎ | Δ |
| 2 | ◎ | ○ |
| 3 | ◎ | ○ |
| 4 | ◎ | ◎ |
| 5 | ◎ | ◎ |
| 6 | ◎ | ◎ |
| 7 | ◎ | ◎ |
| 8 | ○ | ◎ |
| 9 | ○ | ◎ |
| 10 | ○ | ◎ |
| 11 | Δ | ◎ |
| 12 | Δ | ◎ |
| 13 | Δ | ◎ |
| 14 | Δ | ◎ |
| 15 | Δ | ◎ |

Example 5

Using nickel-based brazing materials prepared by incorporating the nickel powder into the powdery brazing nickel in various proportions, base materials were bonded in the same manner as in Example 1 to prepare test pieces. A section of the bonding part in each test piece was microscopically examined to determine the area of voids, if any, and to determine as to whether cracks had generated or not and the area occupied by an α-phase of nickel. With respect to the voids and the α-phase of nickel, the proportions thereof in the bonding part were calculated.

Each test piece was cut, examined with a microscope for the given properties, and evaluated for the properties. The results of these evaluations are shown in Tables 5 to 7 and FIG. 2. A photomicrograph of a fillet part in one of the test pieces is shown in FIG. 2. The fillet part in this photograph is one formed from the brazing material containing 15 wt % powdery nickel. The photograph shows that crystals of an α-phase of nickel had generated in a large amount within the fillet part and in the surface thereof.

TABLE 5

Relationship between powder amount and void proportion

| Amount of powder (%) | Void (%) |
|---|---|
| 5 | 0.00 |
| 10 | 0.15 |
| 15 | 0.45 |
| 20 | 1.30 |
| 25 | 3.60 |

TABLE 6

Relationship between powder amount and percentage cracking

| Amount of powder (%) | Crack (%) |
|---|---|
| 0 | 50 |
| 1 | 40 |
| 2 | 15 |
| 3 | 3 |
| 4 | 0 |

TABLE 7

Relationship between powder amount and α-phase proportion

| Amount of powder (%) | Proportion of α-phase (%) |
|---|---|
| 0 | 30 |
| 5 | 45 |
| 10 | 58 |
| 15 | 68 |
| 20 | 74 |
| 25 | 75 |

The above results show the following.

As the addition amount of powdery nickel was increased, the amount of generated voids increased. When the addition amount of powdery nickel was increased beyond 22%, the amount of generated voids increased abruptly. On the other hand, when powdery nickel was added in amounts not smaller than 4%, cracking did not occur in the fillet parts.

As the addition amount of powdery nickel was increased, the proportion of α-phase nickel increased. However, even when powdery nickel was added in amounts exceeding 20%, the area occupied by α-phase nickel hardly increased any more.

On the other hand, it was ascertained that the influence of voids on corrosion was little when the areal void proportion was not larger than about 2%, as shown in Table A given hereinabove. It can hence be seen that the influence of corrosion by voids is negligible when the addition amount of powdery nickel is not larger than 22%. It can be further seen that the influence of corrosion by voids is completely negligible when the addition amount of the nickel is not larger than 20%.

Further, in Table A given hereinabove, nickel-based brazing materials containing a metal powder in various amounts were used to fabricate EGR coolers, and the EGR coolers were subjected to a test in which cooling water corresponding to an inferior cooling water containing chlorine ions was passed therethrough for 1 month and joint parts were then cut out of each EGR cooler to conduct a structure inspection for examining each part for crevice corrosion.

It was found from the above that powdery nickel was effective when added in an amount of from 2 to 22% by weight based on the nickel-based brazing material. Namely, the addition of powdery nickel in a proportion within the above range was effective in crystallizing a sufficient amount of an α-phase of nickel while inhibiting the influence of corrosion caused by voids, and in diminishing cracking.

It was further found that from the standpoints of completely preventing cracking, minimizing the influence of voids, and sufficiently crystallizing an α-phase of nickel, the addition amount of powdery nickel is preferably from 5 to 20% by weight.

As described above, according to the present invention, a nickel-based brazing material which does not generate continuous brittle phases, is hence prevented from developing cracks, and can give a highly tough bonding part structure can be obtained together with a method of brazing with this brazing material.

Furthermore, the present invention can provide: a nickel-based brazing material for EGR cooler fabrication which attains an improved brazing part structure, has been regulated so as not to yield continuous brittle-phase crystals in fillet parts and as to yield many crystals of an α-phase of nickel in the fillet part surfaces, and is hence prevented from yielding brittle-phase crystals in the fillet surfaces, and which therefore can be prevented from undergoing cracking or crevice corrosion attributable to the partial corrosion of surface brittle phases, has satisfactory corrosion resistance, and is excellent in high-temperature oxidation resistance and resistance to repeated thermal stress; a process for producing an EGR cooler using the brazing material; and an EGR cooler.

While the invention has been described in detail and with reference to specific embodiments thereof, it will be apparent to one skilled in the art that various changes and modifications can be made therein without departing from the spirit and scope thereof.

What is claimed is:

1. A process for producing an EGR cooler the process comprising the steps of:

providing stainless-steel members for the EGR cooler;

preparing a powder mixture by mixing together
   (1) a powdery brazing nickel, and
   (2) a powder of at least one metal selected from the group consisting of nickel, chromium, and nickel-chromium alloys in an amount of from 4 to 22% by weight of the powder mixture;

applying the powder mixture to the stainless-steel members; and subsequently heating the stainless-steel members to melt the powder mixture.

2. The process for producing an EGR cooler according to claim 1, wherein the metal powder is nickel powder.

3. The process for producing an EGR cooler according to claim 1, wherein the metal powder is chromium powder.

4. The process for producing an EGR cooler according to claim 1, wherein the metal powder is nickel-chromium alloy powder.

5. The process for producing an EGR cooler according to claim 1, wherein the metal powder is provided in an amount from 5 to 20% by weight of the powder mixture.

6. The process for producing an EGR cooler according to claim 1, wherein the metal powder has a particle diameter of 20 $\mu$m or smaller.

* * * * *